May 28, 1957    J. F. JOHNSON    2,794,177
PROSPECTING SYSTEM
Filed July 28, 1953
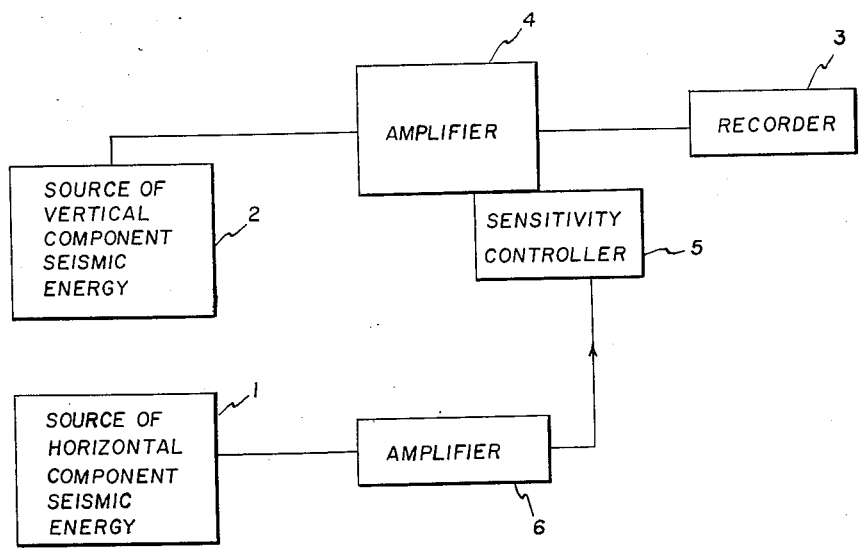
INVENTOR
JAMES F. JOHNSON.
BY Adams, Forward and McLean
ATTORNEY

2,794,177

PROSPECTING SYSTEM

James F. Johnson, Tulsa, Okla., assignor to Sinclair Oil & Gas Company, a corporation of Maine Application July 28, 1953, Serial No. 370,716

4 Claims. (Cl. 340—15)

This invention relates to a method for improving the quality of reflection and refraction seismic surveys of an elastic medium which may be utilized, for example, in petroleum prospecting procedures. More specifically, the present invention is directed to a method of seismic surveying in which the undesirable effects of interfering surface vibrations are materially reduced on or removed from the seismic record.

My invention will be described with reference to the accompanying drawing which is a graphical representation or block diagram of my arrangement of conventional apparatus which may be utilized to eliminate substantially the effects of surface waves in conventional reflection and refraction surveys.

In the usual petroleum seismic prospecting systems, an explosive charge is detonated at an induction or shot point located at or near the surface of the ground, thus initiating seismic waves which penetrate the subterranean strata. Portions of these waves are reflected or refracted by the various subterranean formations with the waves being returned to the earth's surface where they are detected by one or a plurality of geophones or seismometers placed at receiving and recording stations. The electrical effects of these reflected or refracted waves are usually recorded as a function of time, and by means of the observed time required for the waves to travel from the shot point to the receiving station and of the known velocity of the waves traversing the earth, the depth of the subterranean strata may be determined.

Difficulty in determining or recording the time intervals for transmission of the reflected or refracted waves is usually experienced due to interfering surface vibrations travelling through the earth at shallow depths. The vibrations are created by the explosion at the shot point but may also be effected by various other disturbances above the surface of the ground such as heavy equipment traffic. The surface or direct seismic waves are often of considerable magnitude and therefore mask or hide the effects of the desired reflected or refracted waves on the seismic record. The desired waves may become so intermingled with the direct waves that the record of the effects of the explosive charge will not sufficiently differentiate between the desired reflected and refracted waves and the direct waves. Thus, it becomes difficult to assign correct transmission travel times to the reflected or refracted waves, and, as a result, the depth of the subterranean formations may not be accurately determined.

I have found that the undesirable masking effect of surface waves may be deleted from the seismic record by controlling the amplified output of the usual geophone or seismometer located at the receiving station through the action of the surface waves detected at the station. The surface waves passing from the induction point to the receiving station travel substantially horizontal paths and therefore possess large horizontal vectorial components and small vertical vectorial components. Reflected and refracted waves passing from the induction point to the receiving station by way of comparatively deep subsurface formations travel vertical or near vertical paths and thus possess large vertical vectorial components and small horizontal vectorial components.

The present invention includes a seismic prospecting method which utilizes these relative values of the horizontal and vertical components of the surface waves and the reflected or refracted waves to reduce the interfering effect of surface waves on the seismic records. In one aspect of my method direct and reflected or refracted seismic waves are induced in the earth at an induction or shot point and then separately and simultaneously received or detected at or near the surface of the earth at a common receiving station from the shot point. Two geophones designated by numerals 1 and 2 of the drawing are located at the common receiving station and are subject to the effects of the same seismic waves. Geophone 1 is sensitive primarily to horizontal vectorial components of the seismic waves detected while geophone 2 is sensitive primarily to the vertical vectorial components of the waves being detected. Of course, geophone 2 may also be sensitive to horizontal components of the seismic waves but vertical sensitivity is essential. Geophone 2 is a source of seismic energy which takes the form of an electrical current and passes to a recorder 3 through a circuit which supplies the current to the recorder where it is recorded as a function of time. In the drawing this circuit is represented by amplifier 4 having the desired amplitude controls. This amplifier may also incorporate filters if a current of a selected frequency is to be passed to the recorder.

Geophone 1 is a source of seismic energy which takes the form of an electrical current that passes to sensitivity controller 5 through amplifier 6. This amplifier is designed to provide a suitable electrical output to operate the sensitivity controller 5 which is operatively associated with amplifier 4 to reduce materially its sensitivity and amplification when horizontal amplitudes of seismic waves detected by geophone 1 are high, thus indicating the detection of surface waves by the geophone. As an example, sensitivity controller 5 may be designed to deliver a biasing potential to the grid of a vacuum tube of amplifier 4 which potential varies directly as the voltage from amplifier 6. During the detection of the undesirable waves the seismic record is not materially affected by the output of geophone 2 since the sensitivity of amplifier 4 is low. Sensitivity controller 5 is also set to increase the sensitivity of amplifier 4 when the amplitudes of the current from the horizontal component geophone are low, thus indicating that no large horizontal component surface waves are being detected. During the periods when no large horizontal component surface waves are being received the sensitivity of the amplifier 4 is such to produce a record of the effects of any waves detected which have a large vertical component. Thus, the extent of amplification of the output of geophone 2 is controlled in inverse relation to the amplitude of the output of geophone 1 whereby the output of geophone 2 is amplified selectively at low outputs for geophone 1 but suppressed at high outputs for geophone 1. By following this method it is seen that the present invention provides a means whereby the undesirable effects of surface waves are not placed on the seismic record and therefore cannot mask or hide the effects of reflected or refracted waves which are selectively detected for recording at times when no large horizontal component surface waves are being received. Also, in my method amplifier 6 may incorporate frequency filters which permit the selection of portions of the horizontal energy spectrum which show amplitude variations most directly related to the interfering effect of horizontal waves and, therefore, are best suited to drive the sensitivity controller circuits.

The above described technique may be used in connection with sound or magnetic broadband playback recording systems whereby the reproducible records taken of the effects of the explosive charge may be repeated in the laboratory without the expense and inconvenience of repeated field experiments. Such a system operates somewhat the same as described previously in connection with the method performed in the field; however, the sources of seismic energy represented by numerals 1 and 2 of the drawing are broadband playback recordings of the effects detected, respectively, by separate geophones located at the receiving station which geophones have the sensitivity of geophones 1 and 2, respectively. The recordings are played back simultaneously and their outputs passed through amplifiers 4 and 6, sensitivity controller 5 and recorder 3 as described previously in connection with the field detecting and recording method. Accordingly, the output of recording 2 will be reduced through the action of the output of recording 1 in a manner corresponding to the detection of large horizontal component seismic waves by geophone 1. If there be inherent time lags in the functioning of the circuit of either recording that recording may be started before the other recording to account for these lags.

In the several aspects of my invention it may be desirable to omit amplifier 4 or replace it with another circuit. In such cases, the sensitivity controller need only reduce the output of the geophone 2 or recording 2 passing directly to recorder 3 or passing through the substituted circuit at times corresponding to the detection of large horizontal component seismic waves by geophone 1 or recording 1. Although in the above descriptions the output of amplifier 4 is noted as being recorded, it may in some instances be utilized through suitable application as a working part of another recording system.

In general, the above descriptions apply to one seismic recording channel. However, they are equally applicable to systems involving multiple channels which provide for subsurface reflection or refraction continuity and definition.

I claim:

1. In a method of seismic surveying in which seismic waves are initiated in an elastic medium at an induction point and in which the seismic waves are detected at a receiving station, the improvement which comprises detecting at the receiving station the vertical vectorial component and the horizontal vectorial component of the seismic waves as electrical outputs, amplifying separately these electrical outputs, and controlling the extent of amplification of the vertical component output in inverse relation to the amplitude of the output of the horizontal component, whereby the output of the vertical component is amplified selectively at low outputs for the horizontal component but suppressed at high outputs for the horizontal component.

2. In a method of seismic surveying in which seismic waves are initiated in an elastic medium at an induction point and in which the seismic waves are detected at a receiving station, the improvement which comprises detecting at the receiving station the vertical vectorial component and the horizontal vectorial component of the seismic waves as electrical outputs, amplifying separately these electrical outputs, controlling the extent of amplification of the vertical component output in inverse relation to the amplitude of the output of the horizontal component, whereby the output of the vertical component is amplified selectively at low outputs for the horizontal component but suppressed at high outputs for the horizontal component, and recording the controlled output of the vertical component.

3. In a method of seismic surveying in which seismic waves are initiated in an elastic medium at an induction point and in which the seismic waves are detected at a receiving station, the improvement which comprises detecting at the receiving station the vertical vectorial component and the horizontal vectorial component of the seismic waves as electrical outputs, making a first playback recording of the output of the vertical component, making a second playback recording of the output of the horizontal component, simultaneously replaying these recordings, amplifying the electrical outputs of both recordings, and controlling the extent of amplification of the first recording output in inverse relation to the amplitude of the output of the second recording whereby the output of the first recording is amplified selectively at low outputs for the second recording but suppressed at high outputs for the second recording.

4. In a method of seismic surveying in which seismic waves are initiated in an elastic medium at an induction point and in which the seismic waves are detected at a receiving station, the improvement which comprises detecting at the receiving station the vertical vectorial component and the horizontal vectorial component of the seismic waves as electrical outputs, making a first playback recording of the output of the vertical component, making a second playback recording of the output of the horizontal component, simultaneously replaying these recordings, amplifying the electrical outputs of both recordings, controlling the extent of amplification of the first recording output in inverse relation to the amplitude of the output of the second recording whereby the output of the first recording is amplified selectively at low outputs for the second recording but suppressed at high outputs for the second recording, and recording the controlled output of the first playback recording.

References Cited in the file of this patent

UNITED STATES PATENTS

| 2,059,018 | North | Oct. 27, 1936 |
| 2,390,187 | Sharpe | Dec. 4, 1945 |
| 2,413,116 | Shook et al. | Dec. 24, 1946 |
| 2,614,166 | Piety | Oct. 14, 1952 |
| 2,620,890 | Lee et al. | Dec. 9, 1952 |
| 2,634,398 | Piety | Apr. 7, 1953 |
| 2,657,373 | Piety | Oct. 27, 1953 |